US010894314B2

(12) United States Patent
Hocine et al.

(10) Patent No.: US 10,894,314 B2
(45) Date of Patent: Jan. 19, 2021

(54) CONTAINER ATTACHMENT SYSTEM

(71) Applicant: STANLEY BLACK & DECKER INC., New Britain, CT (US)

(72) Inventors: Malik Hocine, Towson, MD (US); Benoit Ozenne, Feuquieres en vimeu (FR); Scott Herdman, Georgetown, OH (US); Roger Palmer, Towson, MD (US)

(73) Assignee: Stanley Black & Decker Inc., New Britain, CT (US)

(*) Notice: Subject to any disclaimer, the term of this patent is extended or adjusted under 35 U.S.C. 154(b) by 0 days.

(21) Appl. No.: 16/276,584

(22) Filed: Feb. 14, 2019

(65) Prior Publication Data

US 2019/0247995 A1 Aug. 15, 2019

Related U.S. Application Data

(60) Provisional application No. 62/630,605, filed on Feb. 14, 2018.

(51) Int. Cl.

| | |
|---|---|
| ***B62B 1/14*** | (2006.01) |
| ***B25H 3/02*** | (2006.01) |
| ***B65D 21/02*** | (2006.01) |
| ***B25H 3/04*** | (2006.01) |

(52) U.S. Cl.

CPC ............... *B25H 3/028* (2013.01); *B25H 3/04* (2013.01); *B65D 21/0204* (2013.01)

(58) Field of Classification Search

CPC ....... A47B 97/00; A47B 91/005; A47B 91/02; B25H 3/028; B25H 3/04; B62B 1/12; B62B 1/14

See application file for complete search history.

(56) References Cited

U.S. PATENT DOCUMENTS

| | | | | |
|---|---|---|---|---|
| 5,588,659 | A * | 12/1996 | Boes | B25H 3/04 280/47.19 |
| 5,645,177 | A * | 7/1997 | Lin | B25H 3/04 206/378 |
| 5,740,910 | A * | 4/1998 | Ueng | A47B 96/068 206/373 |
| 8,157,337 | B2 * | 4/2012 | Manalang | B25H 3/06 312/249.8 |
| 9,132,543 | B2 * | 9/2015 | Bar-Erez | B25H 3/023 |
| 9,566,990 | B2 * | 2/2017 | Bar-Erez | B25H 3/023 |
| 9,643,629 | B2 * | 5/2017 | Bar-Erez | B25H 3/023 |
| 9,737,141 | B2 * | 8/2017 | Johnson | A47B 55/02 |
| 10,106,180 | B2 * | 10/2018 | Bar-Erez | B25H 3/023 |
| 10,227,078 | B2 * | 3/2019 | Bowen | B62B 1/14 |
| 2010/0314978 | A1 * | 12/2010 | Manalang | B25H 3/06 312/243 |
| 2011/0049824 | A1 * | 3/2011 | Bar-Erez | B25H 3/023 280/47.18 |

(Continued)

*Primary Examiner* — Kimberley S Wright

(74) *Attorney, Agent, or Firm* — Caeden Drayton; Adan Ayala

(57) ABSTRACT

A storage attachment system can be configured to attach multiple storage containers as one overall storage system. The attachment system can be configured to add smaller, portable tool containers to a larger tool workstation. The attachment system allows a user to retain the same space blueprint of a large tool workstation but also provides a user additional storage when desired.

9 Claims, 12 Drawing Sheets

(56) References Cited

U.S. PATENT DOCUMENTS

| | | | | |
|---|---|---|---|---|
| 2011/0132853 | A1* | 6/2011 | Drobot | A47B 57/562 211/42 |
| 2011/0192810 | A1* | 8/2011 | Kao | B25H 3/028 211/70.6 |
| 2012/0085714 | A1* | 4/2012 | Johnson | A47B 55/02 211/41.1 |
| 2014/0375181 | A1* | 12/2014 | Bar-Erez | B25H 3/023 312/111 |
| 2015/0336710 | A1* | 11/2015 | Bar-Erez | B25H 3/023 206/508 |
| 2016/0046309 | A1* | 2/2016 | Bar-Erez | B25H 3/023 280/47.18 |
| 2017/0151972 | A1* | 6/2017 | Bar-Erez | B25H 3/023 |
| 2017/0217464 | A1* | 8/2017 | Bar-Erez | B25H 3/023 |

* cited by examiner

CONTAINER ATTACHMENT SYSTEM

CROSS-REFERENCE TO RELATED APPLICATIONS

The present invention claims priority to U.S. Provisional Patent Application Ser. No. 62/630,605 the entire contents which are incorporated herein by reference in its entirety.

FIELD

The present invention relates to a container attachment system, and in particular to an integration of large and small tool containers in an overall storage container system.

BACKGROUND

Numerous container storage systems are known in the art. Several containers systems are for portable use such as described in U.S. Pat. No. 9,566,990. However, there is a constant need in the industry to improve upon existing container storage systems by making them more efficient, easy to use, modular, and multifunctional. Current tool carts provide storage of different tools that the end user may own. The end user may need more space as the user purchases more tools. The user may desire to create a larger container system while still retaining easy portability of tools. Thus, there remains a need for an inexpensive, space saving storage system.

SUMMARY

An object of the present invention is to provide an attachment system for providing additional storage capacity which has a compact design and therefore only a low installation space requirement.

Another object is to provide a container attachment system that provides a user with options to cohesively create attachment systems between large storage workstations and smaller portable containers while still allow easy access to the portable containers for transport.

In one aspect, a storage system may include a frame having at least two rails and a rear member, mount structures, each mount structure having an attachment structure arranged to couple the mount structure to the frame, a plurality of portable containers releasably connectable to the mount structures, releasable connections between respective ones of the portable containers and the mount structures, each of the releasable connections between the portable container and the mount structure being configured to enable the portable container to be releasably connected to the mount structure, the releasable connection coupling the portable container with the mount structure along a wall of the portable container, and wherein the rear member includes attachment means adapted for selective attachment of the frame to a wall of a storage cabinet or tool cart.

In another aspect, An apparatus for storing containers may include at least two rails, mount structures, the mount structures having an end configured to be adjustably coupled to a respective rail and are pivotable at said end, a plurality of portable containers releasably connectable to the mount structures, releasable connections between respective ones of the portable containers and the mount structures, each of the releasable connections between the portable container and the mount structure being configured to enable the portable container to be releasably connected to the mount structure, the releasable connection coupling the portable container with the mount structure along a wall of the portable container, and coupling means adapted to couple the mount structures to respective rails, wherein the coupling means are adapted for selective attachment of the rails to a wall of a storage cabinet or tool cart.

In another aspect, a storage attachment system may include a plurality of brackets, mount structures, each mount structure having an end configured to couple the mount structures to the plurality of brackets, a plurality of portable containers releasably connectable to the mount structures, releasable connections between respective ones of the portable containers and the mount structures, each of the releasable connections between the portable container and the mount structure being configured to enable the portable container to be releasably connected to the mount structure, the releasable connection coupling the portable container with the mount structure along a wall of the portable container, coupling means adapted to affix the mount structures to the plurality of brackets, In another aspect, a container attachment system may include a frame, mount structures adjustably connectable to the frame so as to enable a height adjustment thereof on the frame, containers releasably connectable to the mount structures, and releasable connections between respective ones of the containers and the mount structures, each of the releasable connections between a container of the containers and a mount structure of the mount structures being configured to enable the container to be releasably connected to the mount structure, the releasable connection coupling the container with the mount structure along a sidewall of the container.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein can be considered drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

It will be further understood that the root terms "can", "include", "can include", "may", and/or "have", when used in this specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein "connected" or "attached" includes operation or physical, whether direct or indirect, affixed or coupled, as for example, a mount structure selectively attached to a storage cabinet. Thus, unless specified, "connected" or "attached" is intended to embrace any operationally functional connection.

As used herein "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

The details of one or more implementations are set forth in the accompanying drawings and the descriptions below. Other features will be apparent from the description and drawings, and from the claims.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein.

Corresponding reference characters indicate corresponding parts throughout the several views. The exemplifications set out herein illustrate embodiments of the present invention, and such exemplifications are not to be construed as limiting the scope of the present invention in any manner.

DETAILED DESCRIPTION

An example implementation of a container attachment system or apparatus 10 is shown in FIGS. 1-7. The example system 10 is illustrated in FIGS. 1-7 is a storage attachment system combining portable containers with large storage workstations, simply for ease of discussion and illustration. However, the principles to be described herein may be applied to other types of attachment systems that are operable in different implementations such as, for example, a hook and latch mechanism for attachment.

Figure 1:
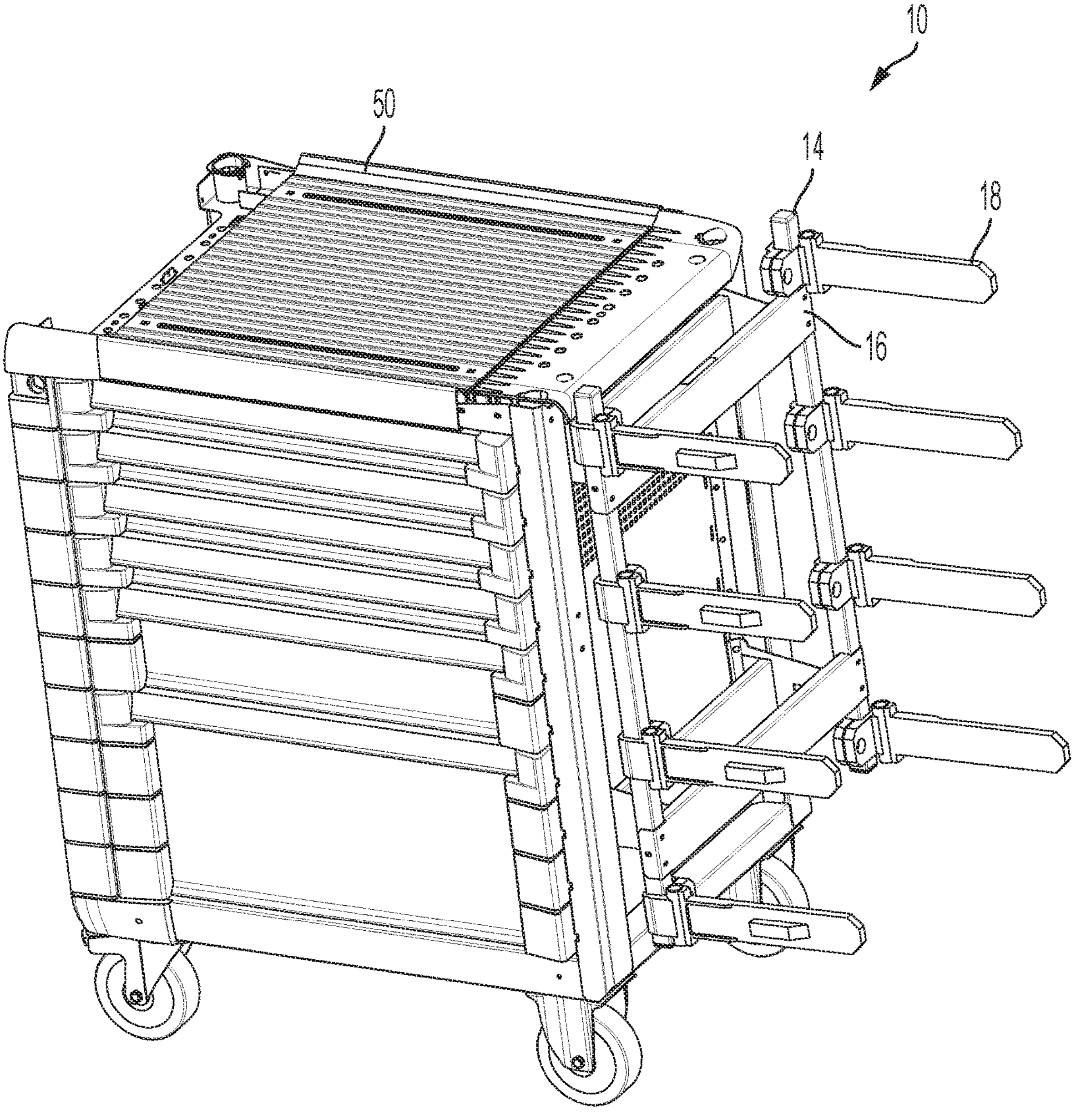
FIG. 1 is perspective view of an exemplary embodiment of a container attachment system, in accordance with implementations described herein.

As illustrated in perspective view shown in FIG. 1, the exemplary container attachment apparatus 10 may include a frame 12 having rails 14 and a rear member 16. The frame 12 comprises two vertically extending bars or rails 14 that are configured and arranged to attach a plurality of mount structures 18 to the rails 14 using attachment structure 28 (see FIG. 4). The attachment structure 28 may also be configured and arranged to enable the mount structures 18 to be adjusted on or removed from the frame 12. The attachment structure 28 will be described in detail later. The apparatus 10 may have more than one rear member 16 secured to the frame 12. The rear member 16 may be affixed to the rails 14 by welding, pins, clamps, screws, fasteners, or other fastening mechanisms known in the art. The rails 14, rear member 16 and mount structures 18 may be made from suitably molded plastic, although it is contemplated that other materials known in the art may be used, such as, for example, metal or wood. FIG. 1 depicts the frame 12 including the rails 14, rear member 16 and mount structures 18 as coupled to a wall of a storage container or tool cart 50.

Figure 2:
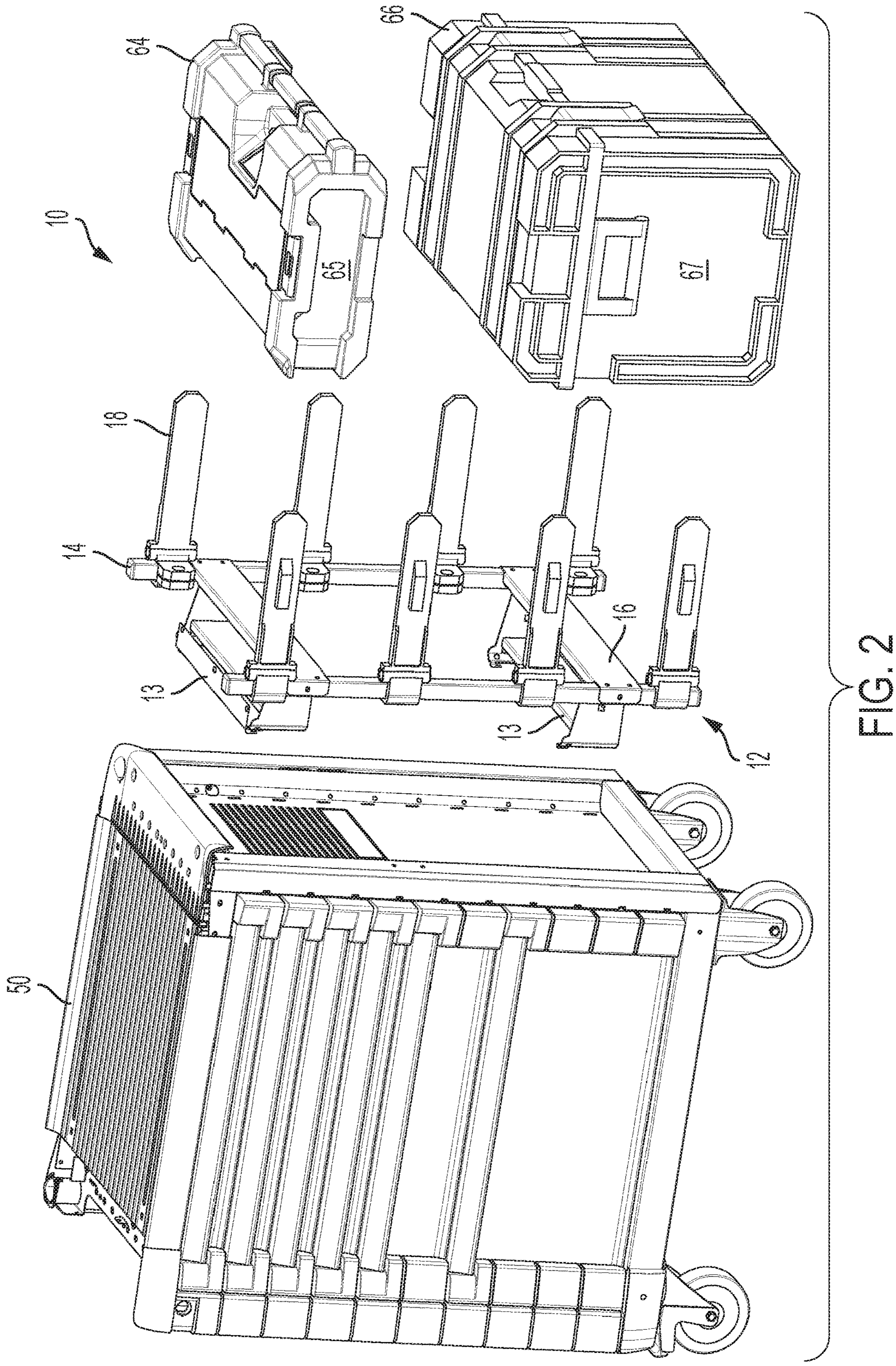
FIG. 2 is a system exploded view of the exemplary container attachment system of FIG. 1, in accordance with implementations described herein.

As illustrated in the system exploded view shown in FIG. 2, a frame 12 may be received onto a wall of a storage container or tool cart 50. The frame 12 is shown disengaged from the storage container 50 wall and uncoupled from the portable storage containers 64, 66. It is contemplated that the mount structures 18 may be attached to the rails 14 of the frame 12 using an attachment structure 28 arranged to couple the mount structure 18 to the rail 14. The attachment structures 28 may be brackets 27 affixed to an end of each respective mount structures 18 and configured to fasten together to substantially form a coupling block 29. The coupling block 29 of the attachment structure 28 may be formed by affixing the brackets 27 together through a plurality of fastening mechanisms, such as adhesive bonding, pins, clamps, screws, fasteners, latches, or other attachment mechanisms known in the art. It is contemplated the formation of the coupling block may provide additional strength to the frame 12 by distributing weight along both brackets in the coupling block 29

Each attachment structure 28 may include a rotatable connection 30 at a portion of the attachment structure 28 that enables the mount structure 18 to be rotated between a folded position and an extended position. In an extended position the mount structure 18 extends generally perpendicularly from a plane defined by the rails 14 or the frame 12. In an extended position of the mount structure 18, the mount structure 18 may have a shape configured for sliding into a recess of a portable container, such as the shape of the mount structure 18 configured to fit into the recess 65 of the small portable container 64.

In addition to a portable container having a recess for receiving the mount structure 18, other coupling elements for supporting and connecting the mount structure to a portable container may include the shape of the mount structure 18 having a protrusion that a handle 67 of a large portable container 66 may overlap for securing the portable container 66 to the mount structure 18. The handles 67 and the operation of latching the large portable container 66 directly to the mount structure 18 will be described in more detail later. The words "small" and "large" are used here to relatively differentiate among the different containers shown in this embodiment and are not intended to be limiting. Thus, the small portable container 64 may be equal or larger in size than the large portable container 66 in some embodiments. The arrangement and location of the containers on the frame 12 may vary and may be customized according to user preferences. The small portable toolbox container 64, and the large portable toolbox container 66 will be described in detail later. It is contemplated that the number of mount structures 18 may vary, depending on the number of containers that the user would like to place on the frame 12. It is also contemplated that different combinations of containers may be used. Just for example, there may be four portable toolbox containers 64 mounted to the frame 12 or three large portable containers 66 mounted to the frame. The apparatus 10 and the containers 64, 66 are generally rectangular in shape. However, any convenient shape may be used. In some embodiments, the containers 64, 66 may be constructed and arranged such that the containers 64, 66 may be placed in a stacked relation directly on top of one another without a mount structure 18 to support every container.

Figure 3:
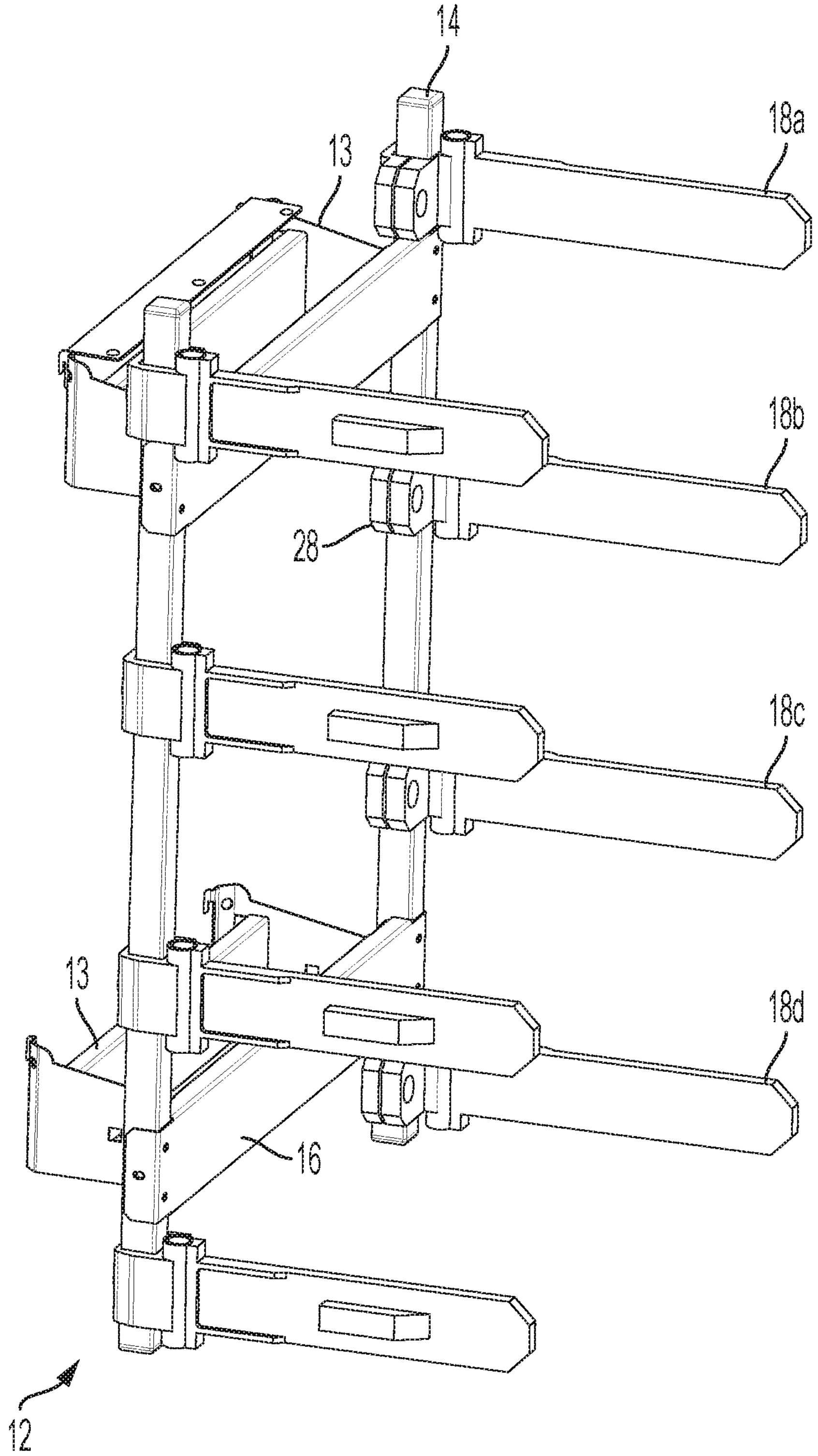
FIG. 3 is a perspective view of the exemplary container attachment system of FIG. 1, in accordance with implementations described herein.

FIG. 3 is a perspective view of the container attachment system or apparatus 10 unsecured to the storage container 50 wall or the portable storage containers 64, 66. As shown in FIG. 3, the frame 12 may include mount structure pairs 18*a*, 18*b*, 18*c*, and 18*d*, illustrating the number of varying mount structures 18 that can be included in the container apparatus 10.

As shown in in this embodiment, the apparatus 10 may include a plurality of support members 13 affixed to frame 12. The support member 13 may include a plurality of fasteners, e.g. hooks, adapted on the exterior of the support member 13 to securely fit into apertures of a wall storage cabinet or tool cart 50. In this embodiment, it is contemplated support member 13 may be affixed directly to a rear member 16 to provide additional frame strength and support. One support member 13 may be a substantially "H" shaped member with a plurality of bores along at least one wall to provide frame 12 strength and support but is not limited in this regard as FIG. 3 depicts the top support member 13 with a lid for configured for engaging with an overlapping lid of the tool cart 50 (FIG. 2). As shown in FIG. 3, the support member 13 may be affixed directly to a rear member 16 to provide additional frame strength and support for the distribution of weight among a number of containers of different sizes and weights (see FIG. 2). The distribution of weight in the frame 12 among the rails 14, rear member 16 and support member 13 can be advantageous, for examples, in instances where portable container 64 and portable container 66 are filled with items of different weight and mass.

While in this embodiment, it is contemplated support member 13 may be affixed directly to a rear member 16, it is not limiting in any sense and different arrangements of the rear member 16 or support member 13 may be implemented. For example, the rear member 16 may include a number of hooks directly on the exterior of rear member 16 (without a support member 13) to securely fit into apertures of a wall storage cabinet or tool cart 50. In this embodiment hooks are contemplated for use to engage a wall of a storage cabinet 50 but it is not limited in any sense and other attachments means may be used, such as pins, clamps, screws, fasteners, latches, or other attachment mechanisms known in the art.

Figure 4:
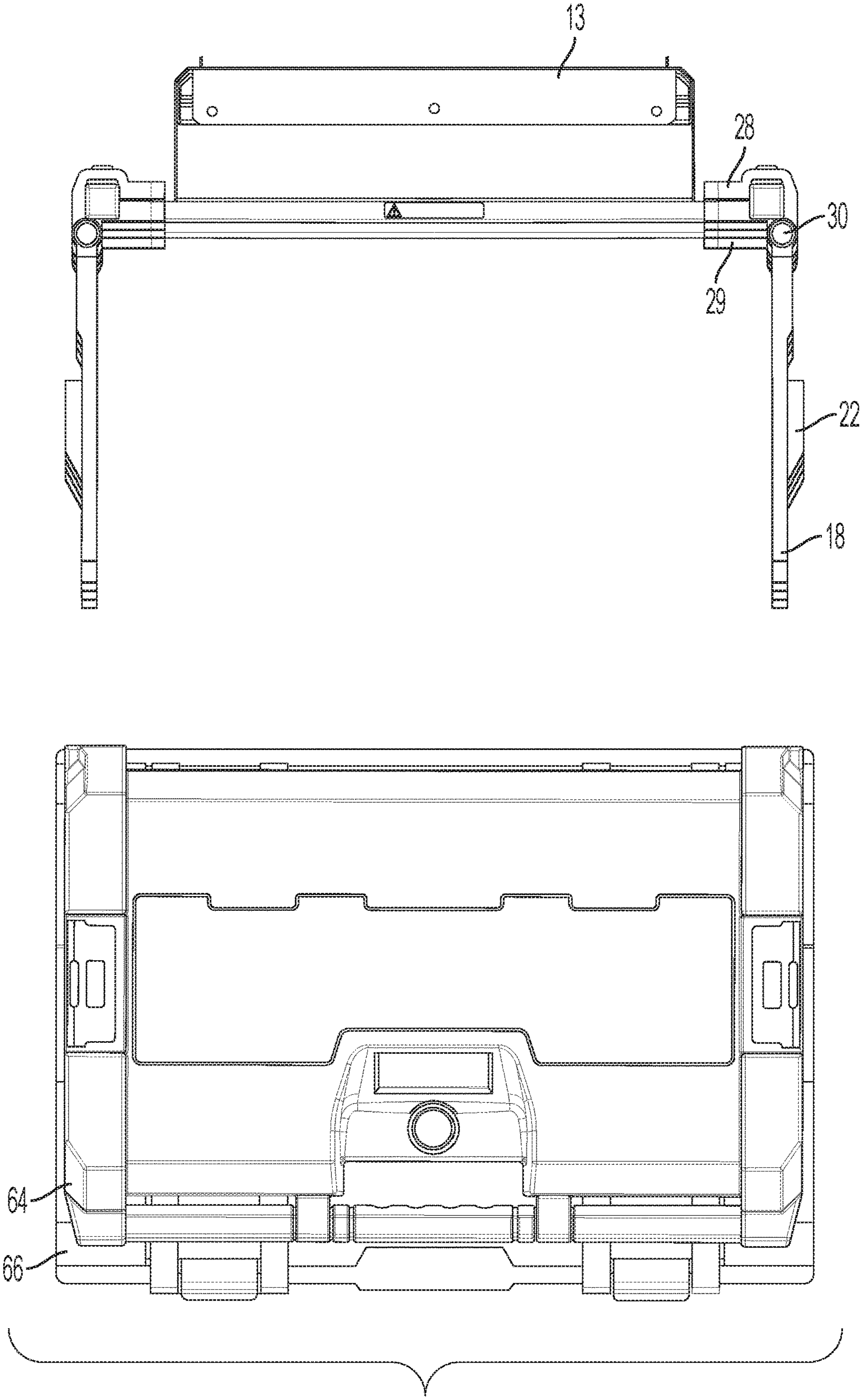
FIG. 4 is a top view of the exemplary container attachment system of FIG. 1 without the storage cabinet, in accordance with implementations described herein.

FIG. 4 is a top view of the frame and portable containers 64, 66 as shown in FIG. 2. As shown in FIG. 4, the frame 12 includes the two vertical rails 14 that are configured and arranged to attach a plurality of mount structures 18 to the rails 14 using attachment structures 28. Also illustrated is a rear member 16 secured to the frame 12. The rear member 16 may be affixed to the rails 14 by welding, pins, clamps, screws, fasteners, or other fastening mechanisms known in the art. The rails 14, rear member 16 and mount structures 18 may be made from suitably molded plastic, although it is contemplated that other materials known in the art may be used, such as, for example, metal or wood.

It is contemplated that the mount structures 18 are not limited to the configuration shown in the illustrated embodiment. The mount structures 18 may have any configuration that enables the containers 64, 66 to be mounted thereon. The mount structures 18 may have, just for example, trays or hooks connected to the frame 12. In some embodiments, the mount structures 18 may be releasably removed from the frame 12. Alternatively, or additionally, in some embodiments, the mount structures 18 may also be optionally fixed to the frame 12. As shown in FIG. 4, the mount structures 18 includes an elongated protrusion 22 provided thereon. The protrusion 22 may have a stop surface provided on an end near the mount structure 18 and may have a slanted surface on the opposite end. The protrusion 22 may be constructed and arranged to retain the containers 64, 66 and prevent the containers 64, 66 from being removed from the frame 12 unless through action of a user.

Figure 5:
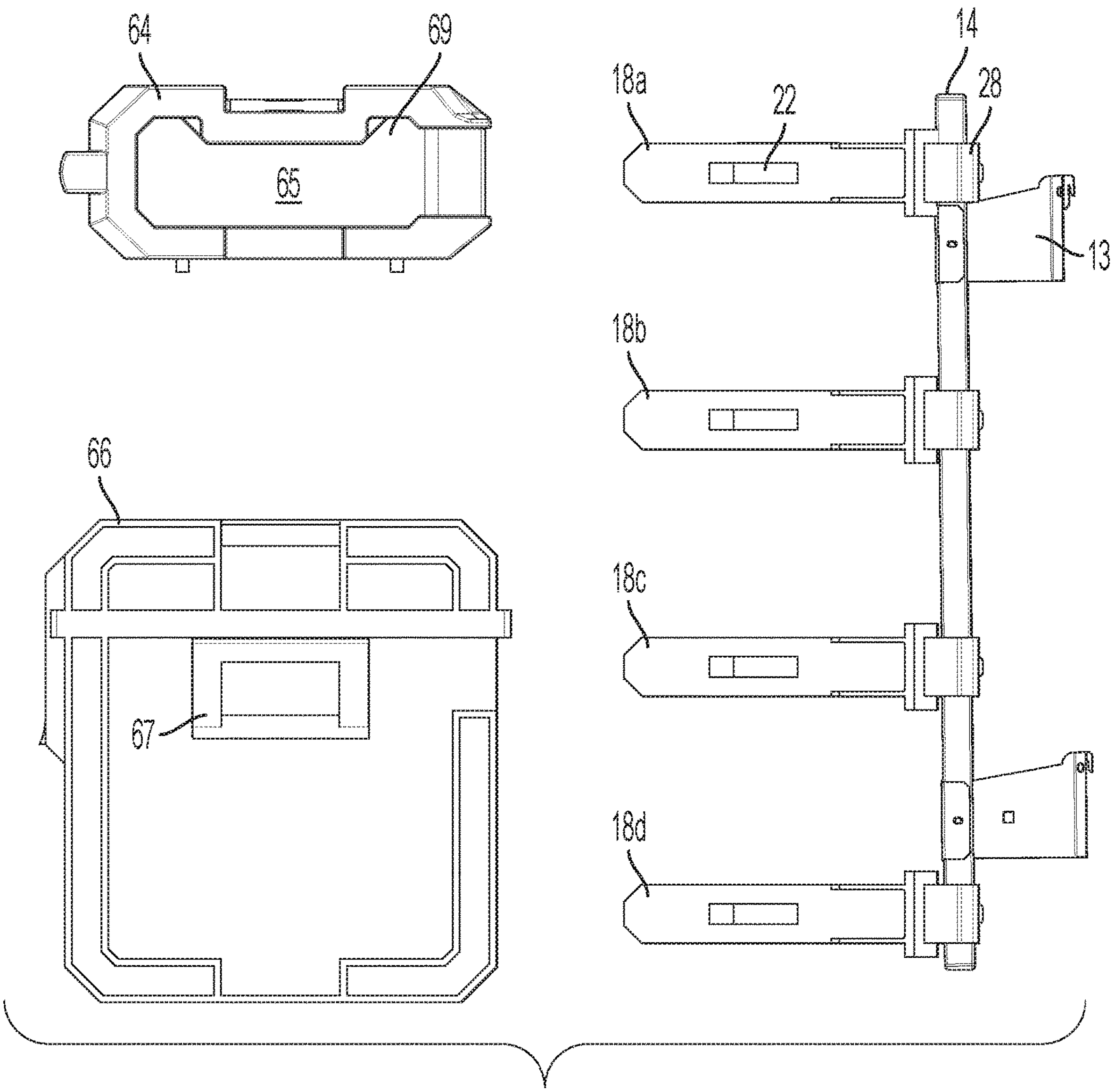
FIG. 5 is a side view of the exemplary container attachment system of FIG. 1 without the storage cabinet, in accordance with implementations described herein.

FIG. 5 is a side view of the exemplary container attachment system or apparatus 10 as shown in FIG. 2 without the storage cabinet 50. In this illustration, the frame 12 includes the mount structures 18*a*-18*d* in an extended position for sliding into a receiving recess 65 of the small portable container 64. A recess 65 may be formed in the side of the portable container 64 to facilitate securing the container 64 to mount structure 18*a*. As shown in FIG. 5, the recess 65 may include a ledge 69 that surrounds the recess 65 and a mount structures 18*a*-18*d*. The ledge 96 may include a cutout formed near the wall of the container. The cutout may be sized and arranged so that the mount structures, e.g. 18*a*, may slide through to be received in the recess 65 when the container 64 is mounted to the frame 12.

The mount structures 18*a*-18*d* may also be coupled to portable containers, such as the large portable container 66, through other coupling elements for supporting and connecting the mount structure 18-*a*-18*d*, such as the mount structures 18*a*-18*d* having a protrusion 22 that a handle 67 of a large portable container 66 may overlap for securing the portable container 66 to the mount structure 18*a*-18*d*. The plurality of containers 64, 66 may be releasably connected to the mount structures 18*a*-18*d* such that each of the plurality of containers 64, 66 may be independently removable from the mount structures 18*a*-18*d* and the frame 12. That is, each of the plurality of containers 64, 66 may be released and removed from their respective mount structures 18*a*-18*d* and from the frame 12 without releasing any of the other containers of the plurality of containers. The plurality of containers 64, 66 may also be releasably connected to the mount structures 18 and arranged such that the containers 64, 66 are spaced from one another. In other words, the containers 64, 66 may be connected to the mount structures 18 and arranged on the frame 12 such that each container 64, 66 does not contact or rest on another container 64-66. As such, a lower container 66 may be removed from the frame 12 without having to remove a container 64 located above the lower container 66.

In other embodiments, a structure different from (or in addition to) the handles 67 may be used to latch the containers onto the mount structures 18*a*-18*d*. In alternate embodiment, a clamp on the portable container may be used to latch the containers 64, 66 to the mount structures 18. In other embodiment, the mount structures 18 may include attachment members constructed and arranged to clamp or otherwise engage or couple or latch or connect onto mount structure engaging members on the containers 64, 66.

Additionally, in this embodiment, the mount structure 18 may be adjustably connectable to the frame so as to enable a height adjustment thereof of the mount structure 18. For example, mount structures 18*b* and 18*c* may each respectively be moved higher or lower vertically as desired by the user to place containers 64, 66 in close or far proximity to each other. This adjustment may be accomplished by selectively loosening screws 31 of the coupling block 29 in the attachment structures 28 and moving the brackets 27 at a desired height and then fastening the screws 31 in the brackets 27 together to form the coupling block 29 of the attachment structure 28. While it is contemplated in this embodiment to use fastening elements, such as screws 31, to form the coupling block 29 it is not limited in any sense and the attachment structure 28 may be formed by affixing the brackets 27 together through a plurality of fastening mechanisms, such as adhesive bonding, pins, clamps, screws, fasteners, latches, or other attachment mechanisms known in the art.

Figure 6:
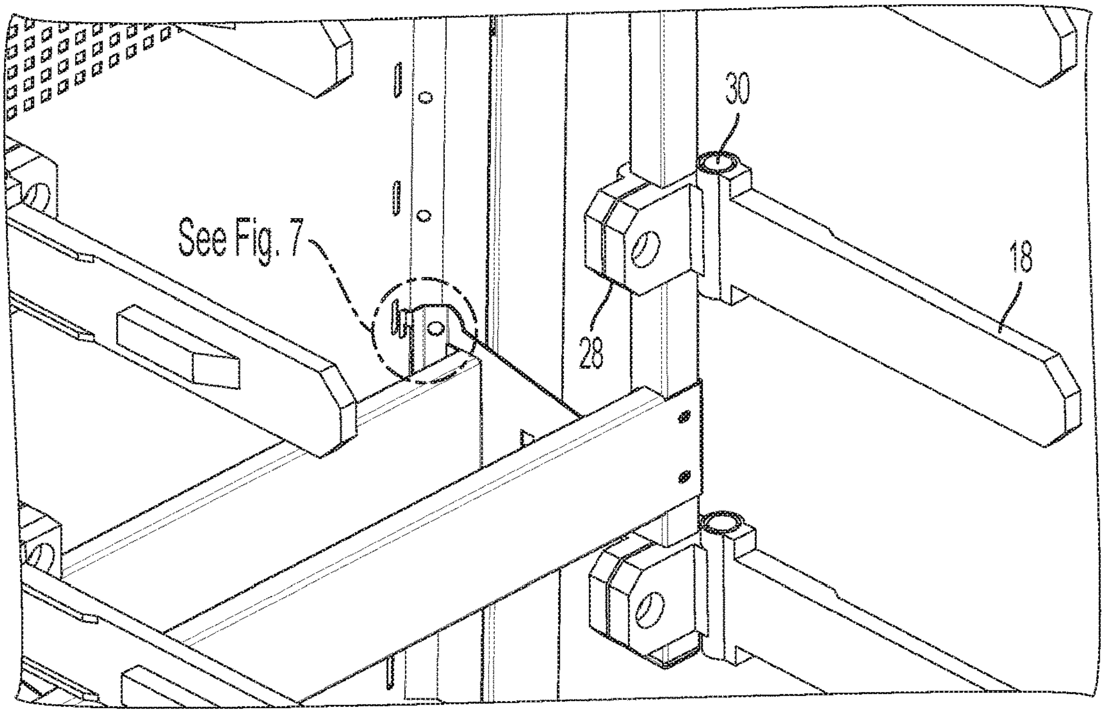
FIG. 6 is a partial, perspective view of the exemplary container attachment system of FIG. 1, in accordance with implementations described herein.

FIG. 6 is a partial, perspective view of FIG. 1 and illustrates the details of the frame 12, rear member 16, support member 13 and the attachment structure 28. In this embodiment, the mount structure 18 has a flat inner surface that in configured to fit against a wall of the portable container but is not limited in any sense and the inner surface of the mount structure 18 may be provided with a plurality of strengthening ribs deployed crosswise relative to one another (see FIG. 8).

Also illustrated in this embodiment is the support member 13 shown in alignment with an aperture 17 in a wall of the tool cart 50. The support member 13 may include a plurality of fasteners, e.g. hooks, adapted to securely fit into apertures of a wall storage cabinet or tool cart 50. It is contemplated in this embodiment to use a support member 13 to couple the frame 12 to the tool cart, it is not limited in this sense and the frame may be coupled to the tool cart by another member. For example, the rear member 16 may include a number of hooks directly on the exterior of rear member 16 (without a support member 13 in the frame 12) to securely fit into apertures of a wall storage cabinet or tool cart 50. In this embodiment the hooks, whether on support member 13 or rear member 16, are contemplated for use to engage a wall of a storage cabinet 50 but it is not limited in any sense and other attachments means may be used, such as pins, clamps, screws, fasteners, latches, or other attachment mechanisms known in the art.

The support member 13 is contemplated as a substantially "H" shaped member with a plurality of bores along at least one wall to provide frame 12 strength and support. The plurality of bores in the support member are configured to be substantially aligned with a corresponding bore of a surface of the tool cart 50 after the hook 15 is fitted into the aperture 17 of the tool cart 50 and the inner top surface of the hook 15 rests against the bottom surface of the aperture. Additional fastening, such as screwing in a plurality of screws into the bores of the support member 13 into the bores of the surfaces in the tool cart may provide additional strength and securement of the frame 12 to the tool cart 50 in instances where a plurality of containers, such as portable container 64 and portable container 66, are filled with items of different weight.

Figure 7:
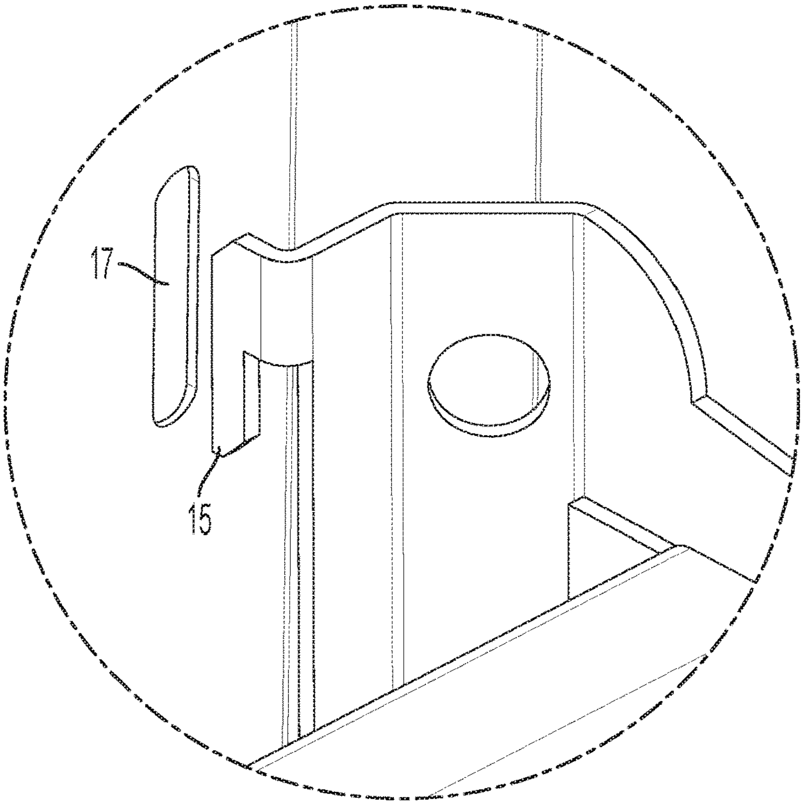
FIG. 7 is a partial, close-up view of the embodiment of the hook and latching mechanism of the container attachment system in FIG. 1, in accordance with implementations described herein.

FIG. 7 is a partial, close-up view of the embodiment of the hook and latch mechanism of the container attachment system in FIG. 6. FIG. 7 illustrates the hook 15 in substantially alignment with the aperture 17 of a wall in the tool cart 50. Additionally, the hook on the support member is configured to be substantially aligned with a corresponding bore (shown in FIG. 6) of a surface of the tool cart 50 after the hook 15 is fitted into the aperture 17 of the tool cart 50 and the inner top surface of the hook 15 rests against the bottom surface of the aperture.

A second embodiment of a container attachment system 210 is shown in FIGS. 8-11. The example container system 110 is illustrated in FIGS. 8-11 is a storage attachment system combining portable containers with large storage workstations, simply for ease of discussion and illustration. As illustrated in perspective view shown in FIG. 8, the embodiment of the container attachment system 110 may include rails 126 and mount structures 118. The rails 126 comprises two vertically extending bars that are configured and arranged to attach a plurality of mount structures 118 to the rails 126 using attachment structures 128 (see FIG. 10C). The attachment structures 128 may also be configured and arranged to enable the mount structures 118 to be adjusted on or removed from the rails 126. The attachment structures 128 will be described in detail later.

Figure 9:
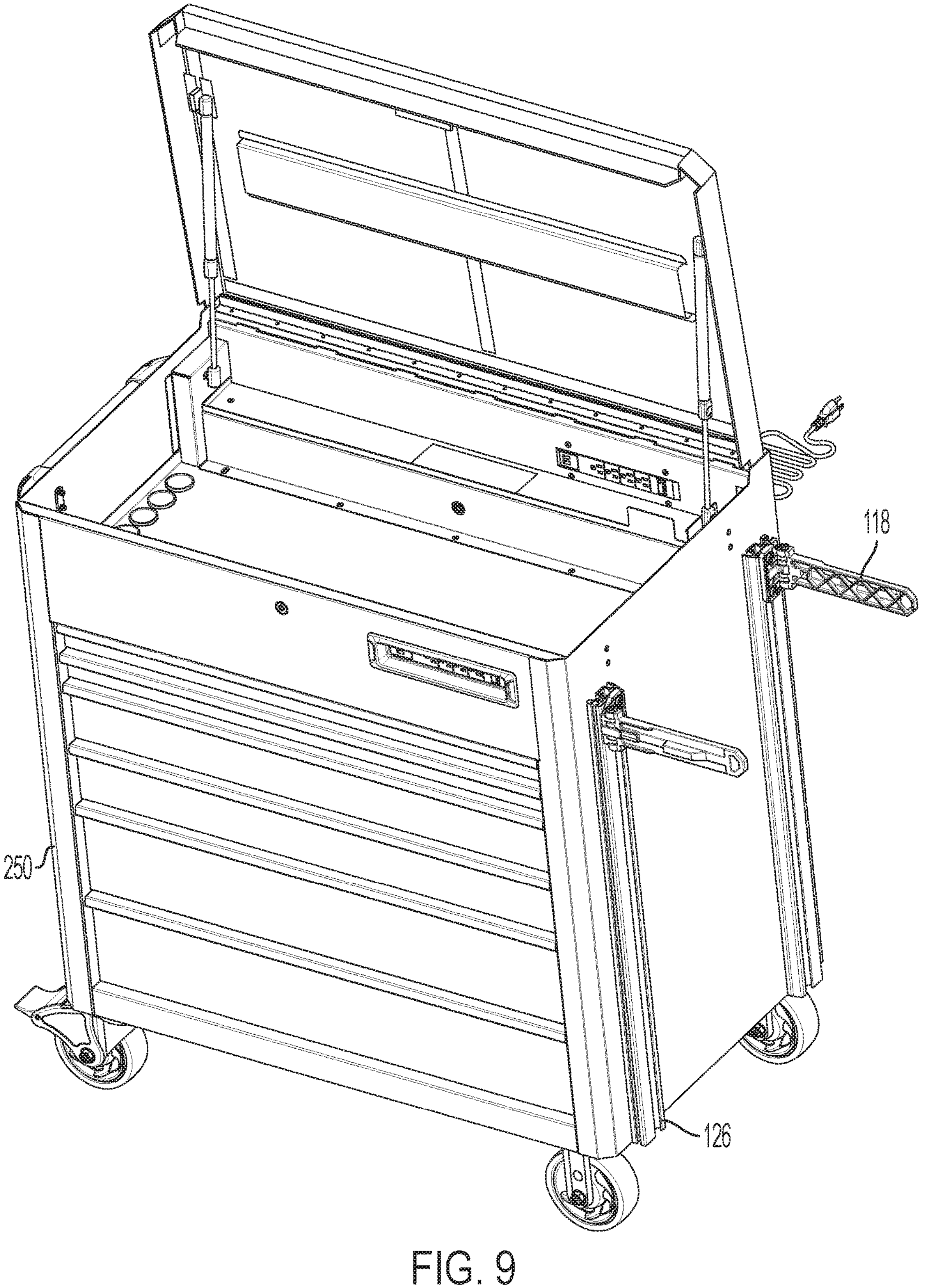
FIG. 9 is a perspective view of the container attachment system of FIG. 8, in accordance with implementations described herein.

FIG. 9 depicts a perspective view of the present embodiment illustrating the respective rails 126 coupled to a storage container 250 and the mount structures coupled to the rails 126 through an end of the mount structures 118. The mount structures 118 may be fastened to a rail 126 through coupling means of a respective end adapted for selective attachment of the mount structures 118 to a respective rail 126.

Figure 10A:
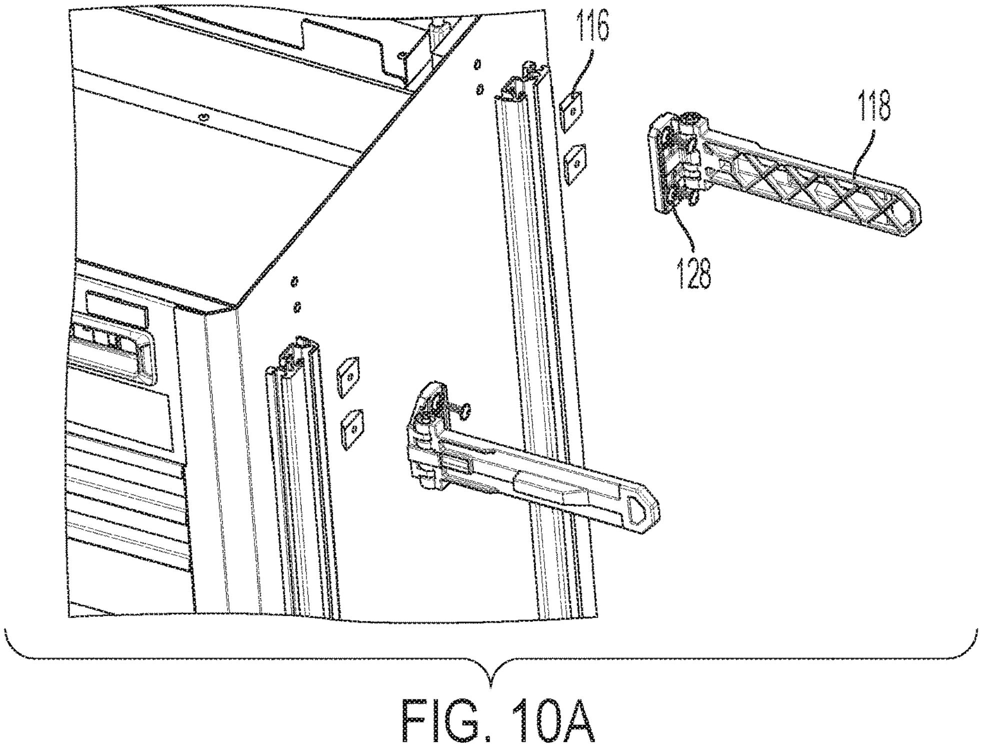
FIG. 10A is a partly exploded, perspective view of the container attachment system of FIG. 8 without the portable container, in accordance with implementations described herein.
Figure 10B:
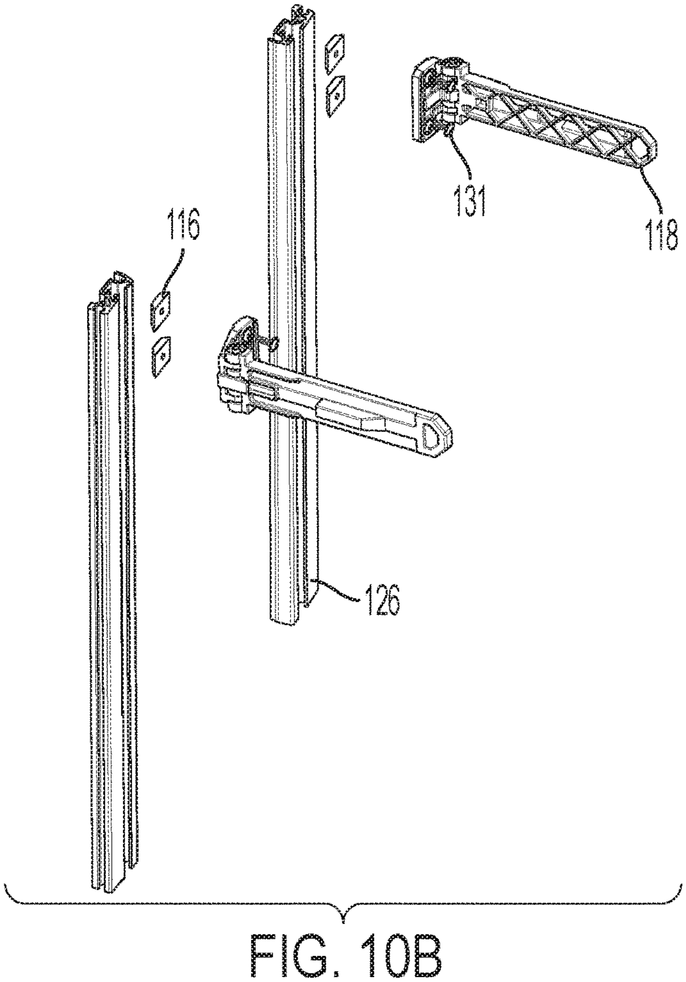
FIG. 10B is an exploded, perspective view of the container attachment system of FIG. 8, in accordance with implementations described herein.
Figure 10C:
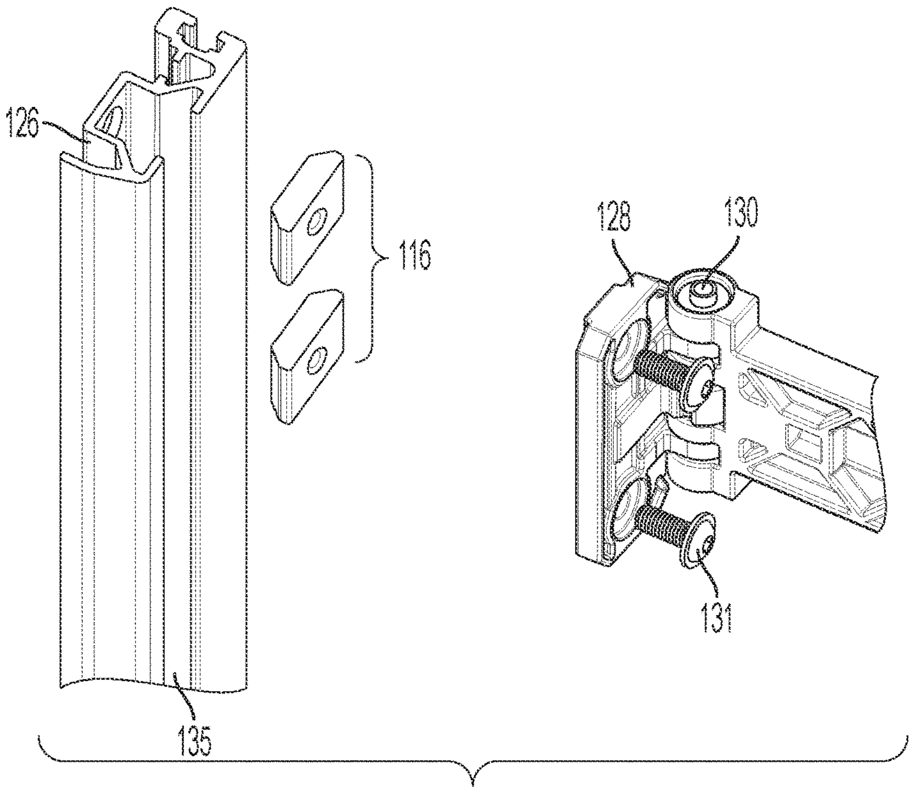
FIG. 10C is a partial, exploded view of the container attachment system of FIG. 8, in accordance with implementations described herein.

FIGS. 10A-10 show the operation of the attachment structures and coupling means for fastening the mount structure 118 to the rails 126. FIG. 10A is a partly exploded, perspective view of the container attachment system of FIG. 8 without the portable container. As shown in FIG. 10 there is illustrated the mount structure 118 with the attachment structure 128 uncoupled to rails 126. The rails 126 are illustrated as not affixed to the storage container 250, such as the rails are not affixed by screws into the bores in the wall of the storage container 250. FIG. 10B depicts an exploded, perspective view of the rails 126, attachment structure 128, mount structure 118, and wedges 116. In this embodiment, the mount structure 118 has strengthening ribs deployed crosswise relative to one another across the inner surface to provide extra support for the mount structures 118 when the portable containers, such as containers 64 and 66, are releasably connected to the mount structures 118. FIG. 10C is a partial, exploded view of the rails 126, wedges 116 and attachment structure 128. In this embodiment, the attachment structure 128 may be a single bracket at an end of the mount structure 118 that is configured to be affixed to a plurality of wedges 116 that are adapted to securely fit into a groove or channel 135 of a rail 126. The wedges are adapted to facilitate selective movement of the mount structures at a user desired height by a user pushing on the mount structure 118 coupled to wedges for movement of the wedge in the channel 135. It is contemplated the attachment mechanism or coupling means to fasten the attachment structure 128 to wedges 116 may be accomplished by placing a screw 131 through a bore in the single bracket and affixing it to wedges 116 but is not limited in this sense and other fastening mechanisms may be used, such as pins, clamps, screws, fasteners, latches, or other attachment mechanisms known in the art.

Figure 11:
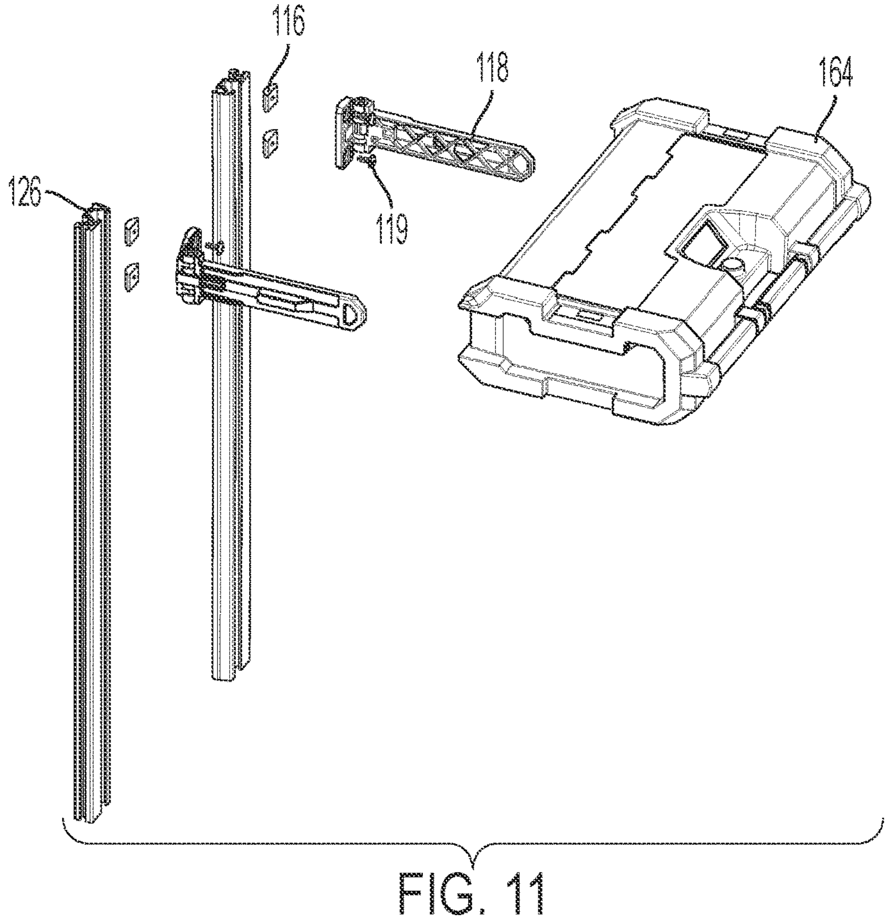
FIG. 11 is a system exploded, perspective view of the container attachment system of FIG. 8, in accordance with implementations described herein.

Each attachment structure 128 may include a rotatable connection 130 at a portion of the attachment structure 128 that enables the mount structure 118 to be rotated or pivoted between a folded position and an extended position. In an extended position of the mount structure 118, the mount structure 118 may have a shape configured for sliding into a recess of a portable container, such as the shape of the mount structure 118 configured to fit into the recess 165 of the small portable container 164 (FIG. 11). The rails 126 and mount structures 118 may be made from suitably molded plastic, although it is contemplated that other materials known in the art may be used, such as, for example, metal or wood. The wedges 116 may be made from rubber or suitably molded plastic, although it is contemplated that other materials known in the art may be used, such as, for example, metal or wood.

Figure 8:
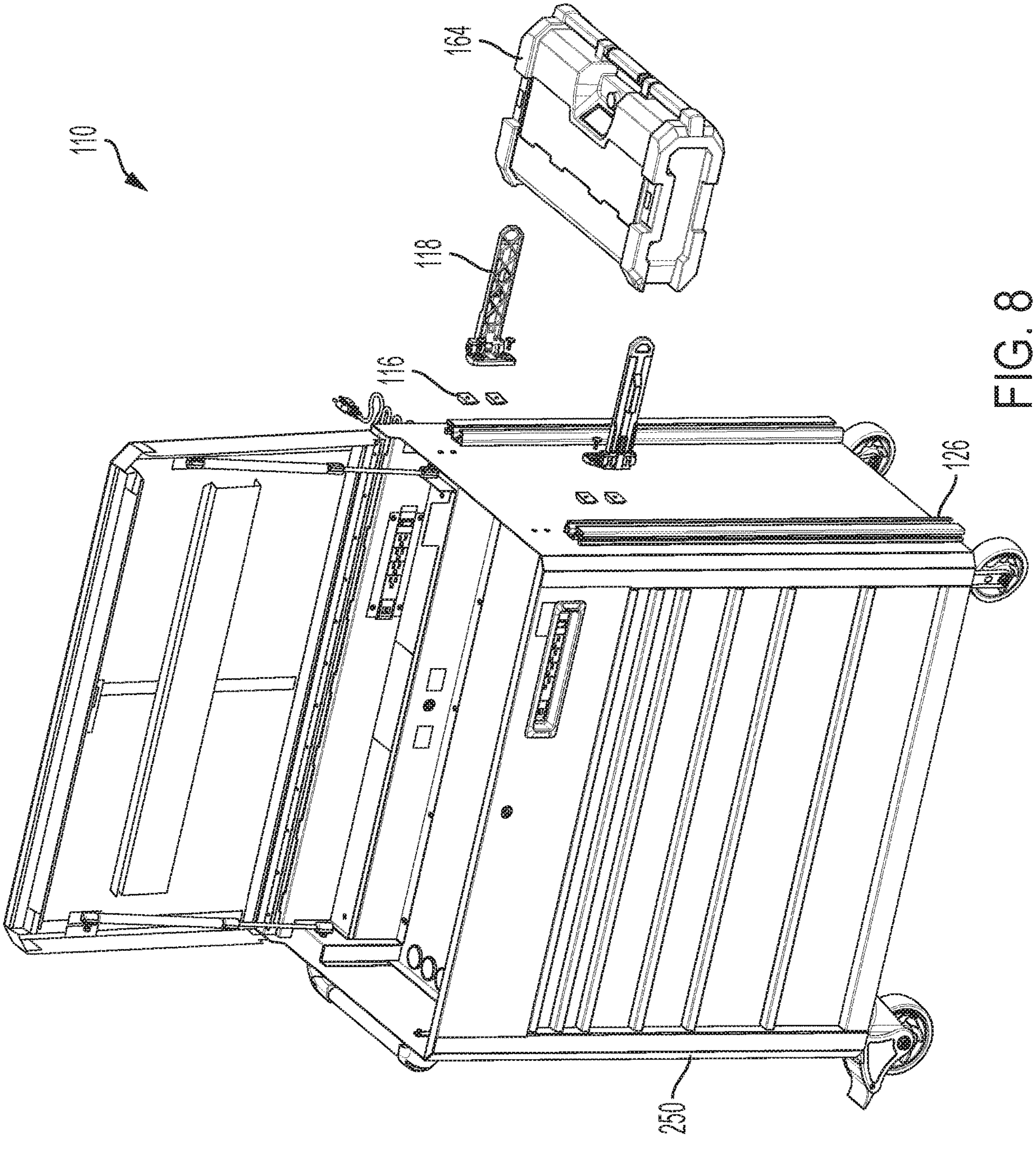
FIG. 8 is a system exploded view of a second embodiment of a container attachment system, in accordance with implementations described herein.

FIG. 11 is an exploded, perspective view of the container attachment system of FIG. 8 without the storage container 250. As shown in FIG. 11, the mount structures 118 may be in an extended position wherein the mount structures 118 extend generally perpendicularly from a plane defined by the rails bars 126. When the mount structures 118 are in the extended position, containers 164 may be releasably connected to the mount structures 118. Alternatively, the mount structures 118 may be folded towards the rails 126 to a folded position for storage and portability. The attachment structures 128 for the mount structures 118 may be constructed and arranged to allow the mount structures 118 to be rotated to the folded position.

A third embodiment of a container attachment system 210 is shown in FIGS. 12-15. The example container system 210 is illustrated in FIGS. 8-11 is a container attachment system for combining portable containers with large storage workstations, simply for ease of discussion and illustration.

Figure 12:
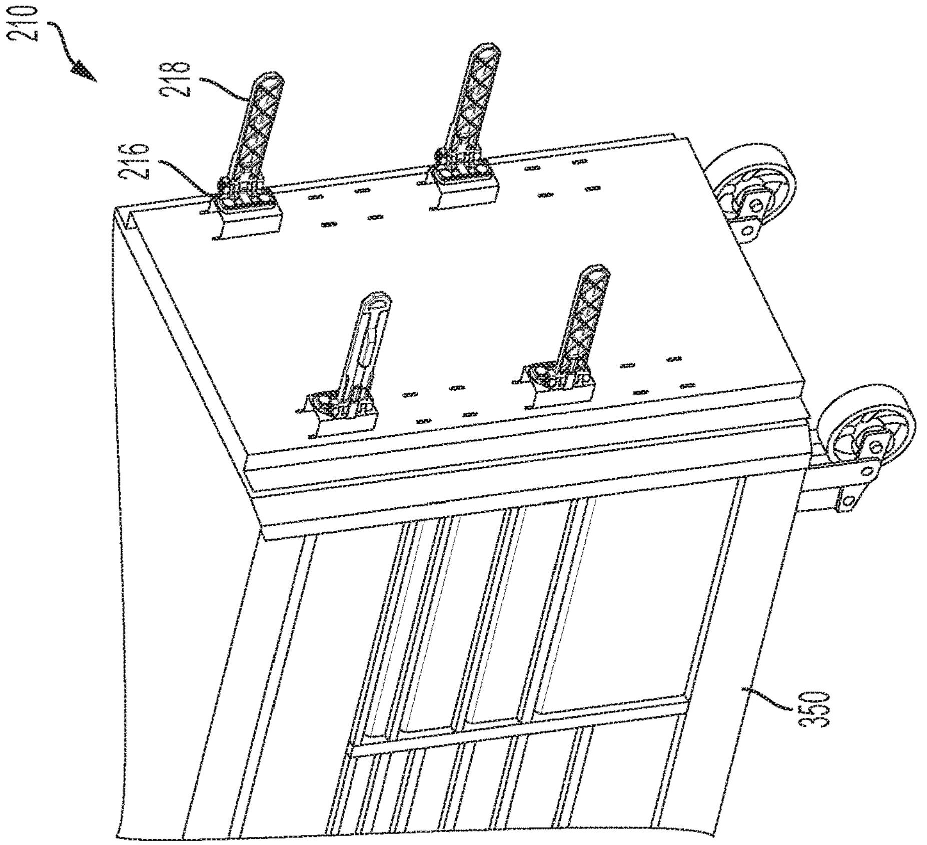
FIG. 12 is perspective view of A third embodiment of a container attachment system, in accordance with implementations described herein.

As illustrated in perspective view shown in FIG. 12, the embodiment of the container attachment system 210 may include brackets 216, mount structures 118, a tool cart 350 and portable containers (such as containers 64 and 66 in FIG. 2). The brackets 216 comprises square shaped brackets hat are configured and arranged to attach a plurality of mount structures 218 to the brackets 216 but is not limited in any sense and any structural brace or hardware may be used. The mount structure 218 may include a rotatable connection 230 at a portion of the mount structure 218 that enables the mount structure 218 to be rotated between a folded position and an extended position. In an extended position of the mount structure 218, the mount structure 218 may have a shape configured for sliding into a recess of a portable container, such as the shape of the mount structure 218 configured to fit into the recess 65 of the small portable container 64 (FIG. 2). The brackets 216 and mount structures 218 may be made from suitably molded plastic, although it is contemplated that other materials known in the art may be used, such as, for example, metal or wood.

Figure 13:
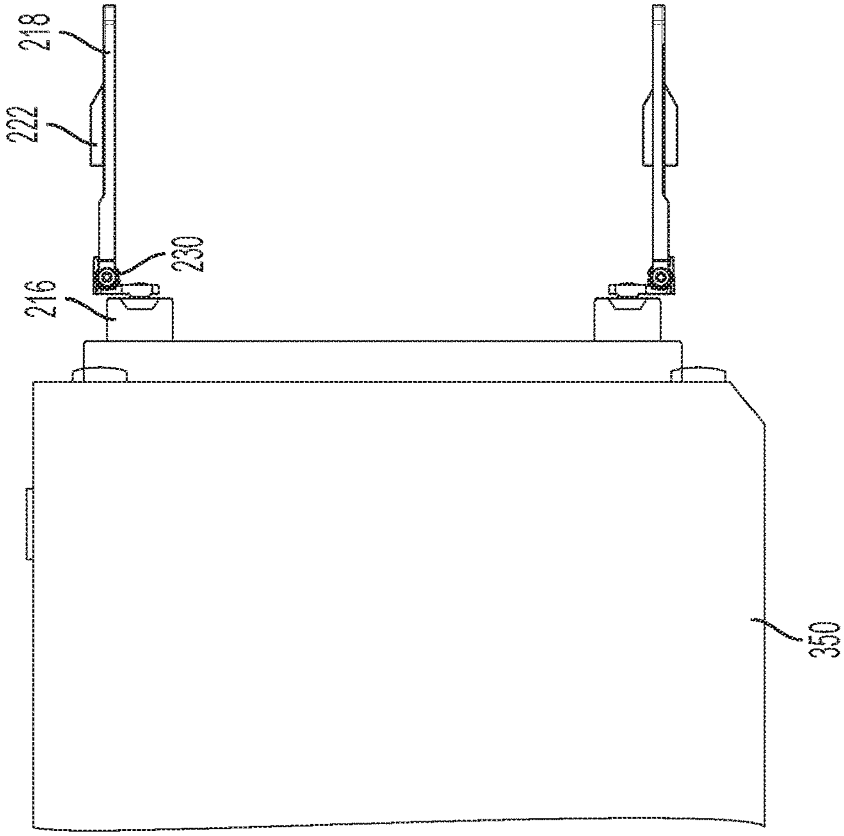
FIG. 13 is top view of the container attachment system of FIG. 12, in accordance with implementations described herein.

FIG. 13 is a top view of the brackets 216, mount structures 218 and tool cart 350 as shown in FIG. 12. As shown in FIG. 13, the mount structures are affixed to brackets 216 that are selectively coupled to the tool cart 350. In this embodiment, the mount structure 218 has strengthening ribs deployed crosswise relative to one another across the inner surface to provide extra support for the mount structures 218 when the portable containers, such as containers 64 and 66 in FIG. 2, are releasably connected to the mount structures 218. In this embodiment, the attachment structure 228 may be an end of the mount structure 218 such as single bracket 229 at an end of the mount structure 218 that is configured to be affixed to brackets 216 and include an attachment mechanism that are adapted to securely fit apertures 217 of a wall in a tool cart 350. The brackets 216 are adapted to facilitate selective movement of the mount structures at a user desired height by a user removing the bracket and mount structure assembly and placing the bracket into a higher or lower aperture.

Figure 14:
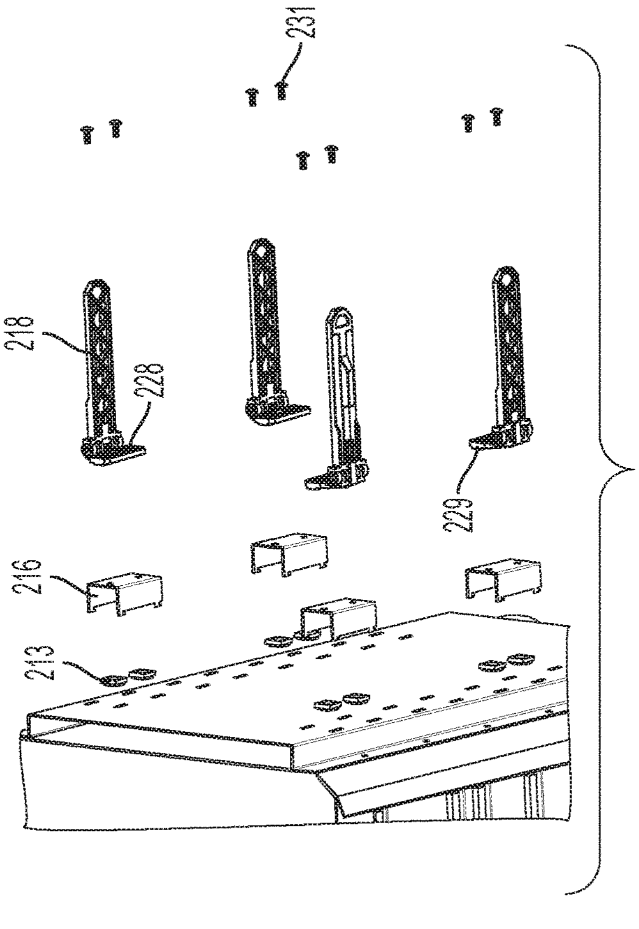
FIG. 14 is a system exploded view of the container attachment system of FIG. 12, in accordance with implementations described herein.

FIG. 14 is a system exploded view of the container attachment system of FIG. 12. As shown in FIG. 14, the mount structure 218 is not affixed to brackets 216. It is contemplated the attachment mechanism to fasten the mount structure 218 to the brackets 216 may be accomplished by placing a screw 231 through a bore in the single bracket 229 and affixing it to wedges 213 through the brackets 216 but is not limited in this sense and other fastening mechanisms may be used, such as pins, clamps, screws, fasteners, latches, or other attachment mechanisms known in the art.

Figure 15:
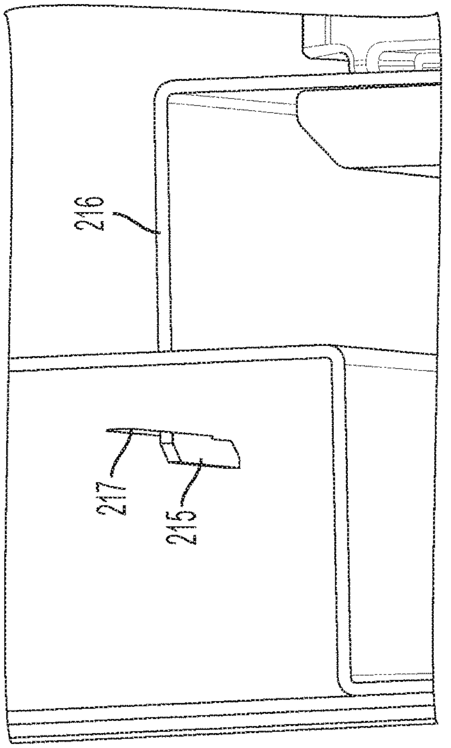
FIG. 15 is a partial, close-up view of the embodiment of the hook and latching mechanism of the storage attachment system in FIG. 12, in accordance with implementations described herein.

FIG. 15 is a partial, close-up view of the embodiment of the hook and latching mechanism of the brackets 216 to the tool cart 350. FIG. 15 depicts the hook 215 engaged with the aperture 217 of a wall in the tool cart 350 when the hook 215 is fitted into the aperture 217 of the tool cart 350 and the inner top surface of the hook 215 rests against the bottom surface of the aperture 217. In this embodiment hooks on the brackets 216 are contemplated for use to engage a wall of a tool cart 350 but it is not limited, and other attachments means may be used, such as pins, clamps, screws, fasteners, latches, or other attachment mechanisms known in the art.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A storage system comprising:

a frame including at least two rails, a rear member, and a support member, wherein the support member is affixed to the rear member;

a storage cabinet or storage workstation, the storage cabinet or storage workstation configured to couple to the frame;

mount structures having an attachment structure arranged to couple each mount structure to the frame, wherein each mount structure is configured for selective height adjustment and wherein each mount structure is removable onto the frame;

a plurality of portable containers releasably connectable to the mount structures;

releasable connections between respective ones of the portable containers and the mount structures, each of the releasable connections between the portable container and the mount structure being configured to enable the portable container to be releasably connected to the mount structure, the releasable connection coupling the portable container with the mount structure along a wall of the portable container; and wherein the support member includes attachment means adapted for selective attachment of the frame to a wall of a storage cabinet or storage workstation.

2. The system of claim 1, wherein each of the releasable connections comprises one or more protrusions provided on at least one of the mount structures.

3. The system of claim 2, wherein the portable container comprises one or more recesses for engaging the releasable connections of a mount structure.

4. The system of claim 3, wherein the one or more recesses of the portable container is engaged with a respective one of the one or more releasable connections and wherein abutment of the releasable connection between a stop surface of the recess and a portion of the releasable connection prevents releasing the portable container from the mount structure unless through action of a user.

5. The system of claim 2, wherein a protrusion of a releasable connection and at least a portion of a releasable latch of the portable container prevents removal of the container from at least one of the mount structures unless through action of a user.

6. The system of claim 1, wherein the attachment structures are configured to enable the mount structures to be adjusted on or removed from the frame.

7. The system of claim 6, wherein the attachment structures are brackets affixed to an end of the mount structures and wherein the attachment structures are adapted to combine together to form a coupling block and include a rotatable connection at a portion that enables the mount structure to be rotated between a folded position and an extended position.

8. The system of claim 1, wherein the attachment means includes a plurality of fasteners adapted to securely fit into apertures of a storage cabinet wall or storage workstation wall.

9. The system of claim 8, wherein the arrangement of the rails and at least one rear member of the frame are configured to provide additional strength for supporting portable containers of various weights.

* * * * *